US012639977B2

(12) United States Patent
Strohmann et al.

(10) Patent No.: US 12,639,977 B2
(45) Date of Patent: May 26, 2026

(54) CONFIGURATION OF AN ULTRASONIC FINGERPRINT SENSOR RELATIVE TO A DISPLAY OF A DEVICE

(71) Applicant: QUALCOMM Incorporated, San Diego, CA (US)

(72) Inventors: Jessica Liu Strohmann, Cupertino, CA (US); Hrishikesh Vijaykumar Panchawagh, Cupertino, CA (US); Yipeng Lu, Moraga, CA (US); Chin-Jen Tseng, Fremont, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/625,257

(22) Filed: Apr. 3, 2024

(65) Prior Publication Data

US 2024/0249549 A1     Jul. 25, 2024

Related U.S. Application Data

(63) Continuation of application No. 17/247,734, filed on Dec. 21, 2020, now Pat. No. 12,183,113.

(51) Int. Cl.
*G06V 40/13*          (2022.01)
*G06F 1/16*           (2006.01)

(52) U.S. Cl.
CPC ........ *G06V 40/1306* (2022.01); *G06F 1/1652* (2013.01)

(58) Field of Classification Search
CPC ................. G06F 1/1652; G06F 1/1641; G06F 3/043–0436; G06F 3/0412; G06F 21/32;
(Continued)

(56) References Cited

U.S. PATENT DOCUMENTS 9,945,818 B2      4/2018   Ganti et al.
12,183,113 B2    12/2024   Strohmann et al.
(Continued)

FOREIGN PATENT DOCUMENTS

CN        105264543 B      1/2019
CN        109670381 A      4/2019
(Continued)

OTHER PUBLICATIONS

International Preliminary Report on Patentability—PCT/US2021/072051—The International Bureau of WIPO—Geneva, Switzerland—Jun. 29, 2023.
(Continued)

*Primary Examiner* — Amr A Awad
*Assistant Examiner* — Aaron Midkiff
(74) *Attorney, Agent, or Firm* — QUALCOMM Incorporated

(57)                 ABSTRACT

Various aspects of the present disclosure relate generally to ultrasonic fingerprint sensor. In some aspects, a device may include a flexible display. The device may include an ultrasonic fingerprint sensor that is configured to transmit and receive an ultrasonic signal in an acoustic path through the flexible display. The device may include an acoustics configuration layer that is situated between the display and the ultrasonic fingerprint sensor. The acoustics configuration layer may be configured to optimize a signal strength of the ultrasonic signal based at least in part on a configuration of one or more layers of the flexible display. Numerous other aspects are provided.

20 Claims, 6 Drawing Sheets

(58) Field of Classification Search

CPC .. G06V 40/12–1318; B06B 1/06–0696; B06B 2201/50–58; B06B 1/0677; B06B 1/00–20; B06B 2201/00–77; G09G 2380/02; H10K 59/60; H10K 59/65; A61B 5/1172; A61B 8/44–4494; H04R 17/00–10; B32B 2307/10

See application file for complete search history.

(56) References Cited

U.S. PATENT DOCUMENTS

| | | | |
|---|---|---|---|
| 2004/0127790 | A1 | 7/2004 | Lang et al. |
| 2014/0354596 | A1 | 12/2014 | Djordjev et al. |
| 2017/0115827 | A1 | 4/2017 | Hecht et al. |
| 2017/0328870 | A1 | 11/2017 | Garlepp et al. |
| 2018/0129849 | A1 | 5/2018 | Strohmann et al. |
| 2018/0373913 | A1 | 12/2018 | Panchawagh et al. |
| 2019/0205593 | A1 | 7/2019 | Kim et al. |
| 2019/0294845 | A1 | 9/2019 | De Foras et al. |
| 2019/0325185 | A1 | 10/2019 | Tang |
| 2019/0384958 | A1* | 12/2019 | Hsieh ................. G06V 40/1306 |
| 2020/0050307 | A1 | 2/2020 | Kuo et al. |
| 2020/0125815 | A1 | 4/2020 | Lu et al. |
| 2020/0179979 | A1 | 6/2020 | Jin et al. |
| 2020/0264755 | A1 | 8/2020 | Jin et al. |
| 2020/0310484 | A1 | 10/2020 | Iwasaki et al. |
| 2020/0310494 | A1 | 10/2020 | Ahn et al. |
| 2020/0393921 | A1 | 12/2020 | Moon et al. |
| 2022/0067328 | A1 | 3/2022 | Ryu et al. |
| 2022/0198172 | A1 | 6/2022 | Strohmann et al. |
| 2025/0104462 | A1 | 3/2025 | Strohmann et al. |

FOREIGN PATENT DOCUMENTS

| | | |
|---|---|---|
| EP | 3457261 A1 | 3/2019 |
| EP | 3671414 A1 | 6/2020 |
| KR | 20220027355 A | 3/2022 |
| WO | 2015127335 A2 | 8/2015 |
| WO | 2020081182 A1 | 4/2020 |

OTHER PUBLICATIONS

International Search Report and Written Opinion—PCT/US2021/072051—ISA/EPO—Apr. 7, 2022.

Partial International Search Report—PCT/US2021/072051—ISA/EPO—Feb. 16, 2022.

Taiwan Search Report—TW110140140—TIPO—Mar. 9, 2025.

Anonymous: "Aluminium oxide", Wikipedia, Nov. 29, 2020, pp. 1-4, XP093279921, 12 Pages.

Fang H.J., et al., "Anodic Aluminum Oxide-epoxy Composite Acoustic Matching Layers for Ultrasonic Transducer Application", Ultrasonics, IPC Science and Technology Press Ltd. Guildford, GB, vol. 70, Apr. 4, 2016, XP029569531, pp. 29-33, 9 Pages.

Taiwan Search Report TW110140140 TIPO Aug. 18, 2025.

Zhou Q., et al., "Alumina/Epoxy Nanocomposite Matching Layers for High-Frequency Ultrasound Transducer Application", IEEE Transactions on Ultrasonics, Ferroelectrics, and Frequency Control, vol. 56, No. 1, Jan. 1, 2009, pp. 213-219, XP011267419.

* cited by examiner

Isometric View

Plan View

CONFIGURATION OF AN ULTRASONIC FINGERPRINT SENSOR RELATIVE TO A DISPLAY OF A DEVICE

RELATED APPLICATION

This application is a continuation of U.S. patent application Ser. No. 17/247,734, filed Dec. 21, 2020, which is incorporated herein by reference in its entirety.

FIELD OF THE DISCLOSURE

Aspects of the present disclosure generally relate to a fingerprint sensor and, for example, to an ultrasonic fingerprint sensor configuration.

BACKGROUND

Fingerprint sensors have been included in devices such as smartphones, cash machines, cars, and/or the like. Fingerprint sensors may be utilized to authenticate a user. A typical fingerprint sensor (e.g., an ultrasonic fingerprint sensor, an optical fingerprint sensor, and/or the like) has a function of capturing an image (or a plurality of images) of a fingerprint of a user for authentication.

SUMMARY

In some aspects, a device may include a flexible display; an ultrasonic fingerprint sensor that is configured to transmit and receive an ultrasonic signal in an acoustic path through the flexible display; and an acoustics configuration layer that is situated between the flexible display and the ultrasonic fingerprint sensor, wherein the acoustics configuration layer is configured to optimize a signal strength of the ultrasonic signal based at least in part on a configuration of one or more layers of the flexible display.

In some aspects, a device may include a flexible display that includes a backing layer, wherein the backing layer includes: a porous foam layer, a base layer, and a recess; and an ultrasonic fingerprint sensor that is configured to transmit and receive an ultrasonic signal in an acoustic path through the flexible display, wherein the ultrasonic fingerprint sensor is positioned within the recess and coplanar to at least one of the porous foam layer or the base layer.

In some implementations, an ultrasonic fingerprint sensor may include a transmitter layer; an acoustics configuration layer; and a sensing pixel layer that is situated between the transmitter layer and the acoustics configuration layer, wherein the acoustics configuration layer is configured to optimize an operational frequency of an ultrasonic signal emitted by the transmitter layer or received by the sensing pixel layer.

In some implementations, a device may include a display; an ultrasonic fingerprint sensor; and an acoustics configuration layer formed of a resonating material, wherein the acoustics configuration layer is at least one of: a layer of the display that is configured to be nearest the ultrasonic fingerprint sensor, or a layer of the ultrasonic fingerprint sensor that is configured to be nearest the display.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
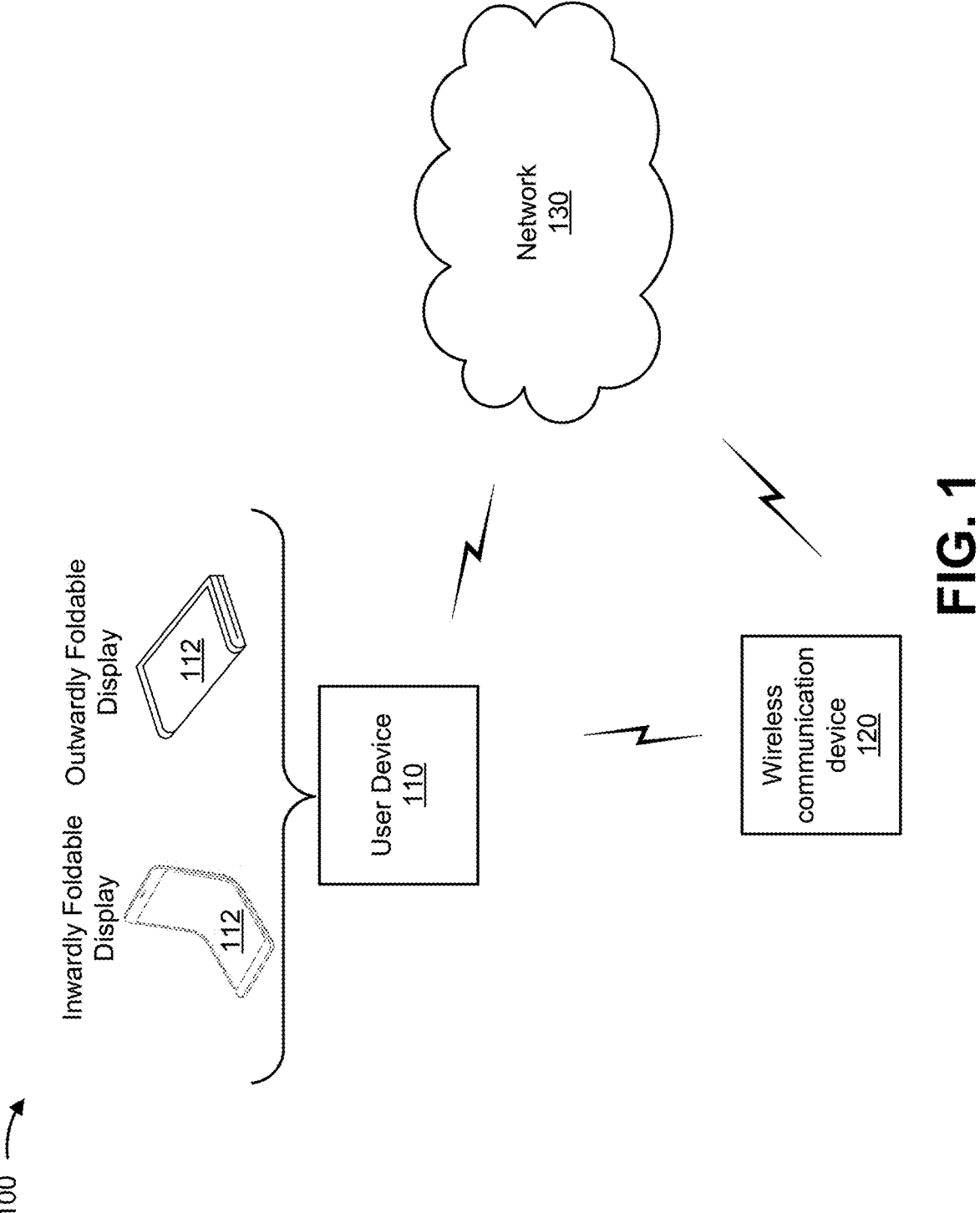
FIG. 1 is a diagram illustrating an example environment in which devices and/or methods described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

User devices and/or communication devices commonly use fingerprint sensors as a method of user authentication. Multiple systems exist for sensing fingerprints, such as optical fingerprint detection systems via a communication device display, capacitive fingerprint sensing and/or ultrasonic fingerprint sensing. An under-display fingerprint sensor system may be provided in a user device or apparatus. Many communication devices use displays with organic light-emitting diode (OLED) displays, active matrix organic light-emitting diode (AMOLED) displays and/or plastic organic light-emitting diode (pOLED) displays, which may also be referred to as flexible OLED displays. Because electromagnetic functions of the display can interfere with capacitive-based fingerprint sensors, the electrical functions of the display may reduce capacitive fingerprint-sensing capability. Optical-based fingerprint systems may be limited or rendered useless where the display includes a light-blocking layer or a large number of metal traces.

An ultrasonic-based fingerprint sensor may be incorporated in a user device under a display. The ultrasonic-based fingerprint sensor may be incorporated under the display of a user device with a light-blocking layer and without interfering with the electrical functions of the user device or a display of the user device.

As display technologies continue to evolve, it is advantageous to reduce the thickness of the display. For example, to fold or bend, a thickness of the flexible display (and/or certain layers of the display, such as one or more cover glass layers) needs to be relatively thinner than a non-foldable or non-bendable display. However, reducing the thickness of the flexible display reduces the rigidity of the flexible display. Reducing the number of layers of the flexible display affects the acoustic path of an ultrasonic fingerprint sensor, relative to the non-foldable display. Furthermore, due to the reduced thickness, compression of such a flexible display can compromise the integrity of components beneath the flexible display. More specifically, when a user is pressing a finger on the flexible display to interact with an ultrasonic fingerprint sensor beneath the flexible display, the finger may compress the flexible display into the one or more elements of the ultrasonic fingerprint sensor, which can damage the ultrasonic fingerprint sensor and/or the flexible display.

The configurations and aspects of an ultrasonic fingerprint sensor described herein may be suitable for use with a flexible display that is configured to be foldable or bendable. For example, a user device may include a flexible display, an ultrasonic fingerprint sensor, and an acoustics configuration layer that is configured to optimize a signal strength of an ultrasonic signal of the ultrasonic fingerprint sensor while maintaining the integrity of the ultrasonic fingerprint sensor and/or the flexible display. The acoustics configuration layer may be configured to cover a threshold percentage of the active area, thereby allowing for an increased area of fingerprint scanning by the ultrasonic fingerprint sensor.

In this way, a configuration of an ultrasonic fingerprint sensor and/or a flexible display of a device (e.g., a display device and/or touchscreen of a user device, user equipment, tablet computer, or other similar device) enables the ultrasonic fingerprint sensor to be positioned beneath the display, optimize a performance of the ultrasonic fingerprint sensor according to the position of the ultrasonic fingerprint sensor and/or the flexible display, and/or prevent damage to the ultrasonic fingerprint sensor, flexible display, or other components of the device.

FIG. 1 is a diagram illustrating an example system 100 in which devices and/or methods described herein may be implemented, in accordance with various aspects of the present disclosure. As shown in FIG. 1, system 100 may include a user device 110 with a display 112, a wireless communication device 120, and/or a network 130. Devices of system 100 may interconnect via wired connections, wireless connections, or a combination of wired and wireless connections.

User device 110 includes one or more devices capable of including a configuration of an ultrasonic fingerprint sensor relative to a display, as described herein. For example, user device 110 may include one or more devices capable of receiving, generating, storing, processing, and/or providing information associated with one or more sensors (e.g., ultrasonic sensors, capacitive touch sensors, accelerometers, piezoelectric sensors, and/or the like) for detecting a user described herein. More specifically, user device 110 may include a communication and/or computing device, such as a user equipment (e.g., a smartphone, a radiotelephone, and/or the like), a laptop computer, a tablet computer, a handheld computer, a wearable communication device (e.g., a smart wristwatch, a pair of smart eyeglasses, and/or the like), a home security system (e.g., with a touch controlled security panel), a home appliance, a vehicle (e.g., which has capacitive touch controlled doors, consoles, and/or the like), a payment terminal, an Internet of Things (IOT) device, or any other similar type of device.

The display 112 of the user device 110 may be a flexible display (e.g., a touchscreen with a capacitive touch interface) and an ultrasonic fingerprint sensor. As shown, the display 112 may include an inwardly foldable display and/or an outwardly foldable display.

Similar to user device 110, wireless communication device 120 includes one or more devices capable of receiving, generating, storing, processing, and/or providing information associated with a user input and/or user interaction described herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, network 130 may include a data network and/or be communicatively with a data platform (e.g., a web-platform, a cloud-based platform, a non-cloud-based platform, and/or the like) that is capable of receiving, generating, processing, and/or providing information associated with a user input and/or user interaction detected and/or analyzed by user device 110.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
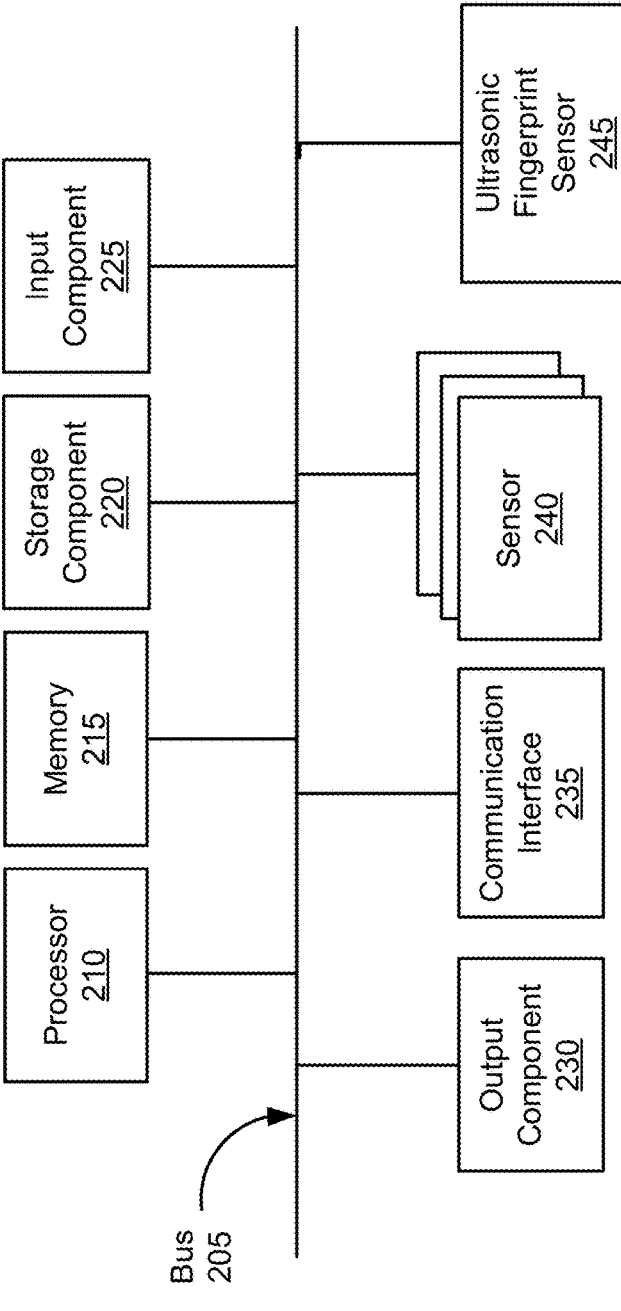
FIG. 2 is a diagram illustrating example components of one or more devices shown in FIG. 1, such as a user device, in accordance with various aspects of the present disclosure.

FIG. 2 is a diagram of example components of a device 200. Device 200 may correspond to user device 110 and/or wireless communication device 120. Additionally, or alternatively, user device 110, and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, one or more sensors 240 (referred to individually as a "sensor 240" and collectively as "sensors 240"), and an ultrasonic fingerprint sensor 245.

Bus 205 includes a component that permits communication among the components of device 200. Processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. Processor 210 is implemented in hardware, firmware, or a combination of hardware and software. In some aspects, processor 210 includes one or more processors capable of being programmed to perform a function.

Memory 215 includes a random-access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input. For example, input component 225 may be associated with a user interface as described herein (e.g., to permit a user to interact with the one or more features of device 200). Input component 225 includes a capacitive touchscreen display that can receive user inputs. Input component 225 may include a keyboard, a keypad, a mouse, a button, a switch, a microphone, and/or the like. Additionally, or alternatively, input component 225 may include a sensor for sensing information (e.g., a vision sensor, a location sensor, an accelerometer, a gyroscope, an actuator, and/or the like). In some aspects, input component 225 may include a camera (e.g., a high-resolution camera, a low-resolution camera, and/or the like). In some aspects, input component 225 may include correspond to, and/or be associated with one or more of sensors 240.

Output component 230 includes a component that provides output from device 200 (e.g., a display, a speaker, one or more light-emitting diodes (LEDs), and/or the like). Output component 230 may include a display device. According to some examples described herein, a display device may include a flexible display that includes one or more foldable or bendable layers. The flexible display may be foldable and/or bendable (e.g., inwardly and/or outwardly) by using a hinge (and/or other pivot mechanism) that allows for the flexible display to be folded along a crease formed by the hinge (e.g., enabling an angle of rotation of the flexible display along the crease to be less than 180°). Some examples described herein may apply to flexible displays that are foldable and/or bendable. Accordingly, while certain examples described may refer to a flexible display being foldable or folded, such examples may similarly apply to the flexible display being bendable or bent. Moreover, configurations the display device may be based on whether the display device is to be foldable and/or may be based on whether the display device is to be inwardly foldable or outwardly foldable. For example, certain thicknesses of certain layers of an example flexible display, described herein, may depend upon whether the display device is a flexibly display and/or whether the flexible display is to be inwardly foldable and/or outwardly foldable.

Communication interface 235 includes a transceiver and/or a separate receiver and transmitter that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency (RF) interface, a universal serial bus (USB) interface, a Wi-Fi interface, a cellular network interface, a wireless modem, an inter-integrated circuit ($I^2C$), a serial peripheral interface (SPI), or the like.

Sensor 240 may include one or more devices capable of sensing characteristics associated with device 200 (e.g., characteristic of a physical environment or operating condition of device 200). Sensor 240 may include one or more integrated circuits (e.g., on a packaged silicon die) and/or one or more passive components of one or more flex circuits to enable communication with one or more components of device 200.

Sensor 240 may include a vision sensor (e.g., an image sensor, an optical sensor, a camera, and/or the like) that has a field of view from which sensor 240 may obtain an image (e.g., an image of a fingerprint). Additionally, or alternatively, sensor 240 may include a hydrometer (e.g., to detect the presence or density of a liquid in an environment of device 200), a magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, and/or the like), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, a gas sensor, and/or the like.

Sensor 240 may include an ultrasonic sensing element to detect the presence of a user and/or be used in association with ultrasonic fingerprint detection. In some aspects, the ultrasonic sensing element may be used by ultrasonic fingerprint sensor 245 to obtain an ultrasonic measurement of a fingerprint of a user. As described herein, an ultrasonic sensor, as a passive sensor, may detect and/or analyze vibrations from a user that can be used to passively detect the user based at least in part on piezoelectric properties of the ultrasonic sensor (e.g., without transmitting an ultrasonic signal). An ultrasonic sensor, as an active ultrasonic sensor, may transmit an ultrasonic signal and receive a corresponding reflected ultrasonic signal that can be measured to determine whether the user's finger is on (or near) the user device, a touchscreen of the user device, and/or a fingerprint scanner (e.g., ultrasonic fingerprint sensor 245) of the user device.

Ultrasonic fingerprint sensor 245 includes one or more devices capable of analyzing a fingerprint of a user. Ultrasonic fingerprint sensor 245 may be associated with and/or communicatively coupled with one or more of sensors 240. Ultrasonic fingerprint sensor 245 may be configured, using any suitable technique, as a user authentication device to analyze a fingerprint of a user to determine whether the user is an authorized user of device 200 and/or an application associated with device 200. Accordingly, as an authentication device, ultrasonic fingerprint sensor 245 may, based at least in part on identifying a fingerprint of an authorized user, permit an unlock operation of the user device to be performed (e.g., to access an application of the user device, to access a home screen of the user device, to log in to an account associated with the user, and/or the like).

Device 200 may perform one or more processes described herein. Device 200 may perform these processes in response to processor 210 executing software instructions stored by a non-transitory computer-readable medium, such as memory 215 and/or storage component 220. "Computer-readable medium" as used herein refers to a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, the means for performing the processes and/or operations described herein may include bus 205, processor 210, memory 215, storage component 220, input component 225, output component 230, communication interface 235, sensor 240, and/or any combination thereof.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
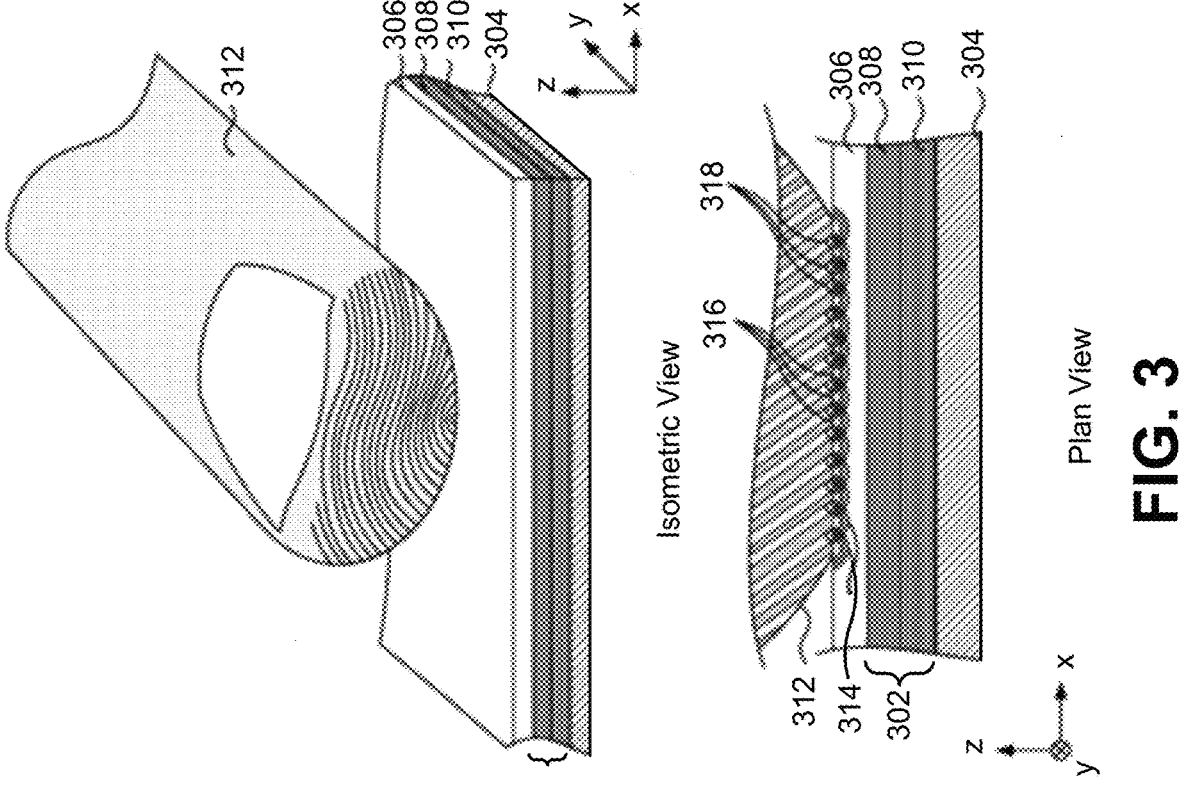
FIG. 3 is a diagram illustrating an example associated with an ultrasonic fingerprint sensor configured in accordance with various aspects of the present disclosure.

FIG. 3 shows a cross-sectional isometric view and cross-sectional plan view of an example of a portion of an example ultrasonic fingerprint sensor system 300 according to an aspect described herein. For example, the ultrasonic fingerprint sensor system 300 may implement the ultrasonic fingerprint sensor 245 described with reference to FIG. 2. The ultrasonic fingerprint sensor system 300 may include an ultrasonic transducer 302 that overlies a substrate 304 and that underlies a platen 306 (e.g., a flexible display and/or one or more layers of a flexible display described herein). The ultrasonic transducer 302 may include both piezoelectric active layer 308 and sensing pixels 310. The piezoelectric layer 308 is generally configured to generate and transmit an ultrasonic signal (e.g., in the form of ultrasonic waves) towards the platen 306, and in the illustrated implementation, towards a finger 312 positioned on the upper surface of the platen 306. In some aspects, the ultrasonic transmitter 308 may more specifically be configured to generate and transmit ultrasonic waves towards the platen 306. For example, the piezoelectric material of the ultrasonic transmitter 308 may be configured to convert electrical signals provided by a controller of the ultrasonic fingerprint sensor system 300 into a continuous or pulsed sequence of ultrasonic plane waves at a scanning frequency. In some aspects, the ultrasonic transmitter 308 includes a layer of piezoelectric material such as, for example, polyvinylidene fluoride (PVDF) or a PVDF copolymer such as PVDF-TrFE. In some aspects, other piezoelectric materials may be used in the ultrasonic transmitter—and/or the ultrasonic receiver—, such as aluminum nitride (AlN), lead zirconate titanate (PZT) or bismuth sodium titanate. In some aspects, the ultrasonic transmitter and/or ultrasonic receiver may additionally or alternatively include capacitive ultrasonic devices such as capacitive micromachined ultrasonic transducers (CMUTs) or piezoelectric ultrasonic devices such as piezoelectric micromachined ultrasonic transducers (PMUTs, also referred to as "piezoelectric micromechanical ultrasonic transducers").

The ultrasonic sensing pixels 310 is generally configured to detect ultrasonic reflections 314 resulting from interactions of the ultrasonic waves transmitted by the ultrasonic transmitter 308 with ridges 316 and valleys 318 defining the fingerprint of the finger 312 being scanned. As shown, the piezoelectric layer 308 is beneath the sensing pixel layer 310 and a flexible display (referred to herein as a "receiver-down configuration"). Accordingly, the piezoelectric active layer 308 is positioned between the platen 306 and the sensing pixel layer 310. In some aspects, the sensing pixel layer 310 may overlie the piezoelectric active layer 308 (referred to herein as a "receiver-up configuration"). In such a case, the sensing pixel 310 is positioned between the platen 306 and the piezoelectric active layer 308.

The ultrasonic receiver 310 may be configured to generate and output electrical output signals corresponding to the detected ultrasonic reflections 314. In some aspects, the ultrasonic receiver 310 may include a second piezoelectric layer different from the piezoelectric layer of the ultrasonic transmitter 308. For example, the piezoelectric material of the ultrasonic receiver 310 may be any suitable piezoelectric material such as, for example, a layer of PVDF or a PVDF-TrFE copolymer. The piezoelectric layer of the ultrasonic receiver 310 may convert vibrations caused by the ultrasonic reflections into electrical output signals. In some aspects, the ultrasonic receiver 310 further includes a thin-film transistor (TFT) layer. In some such aspects, the TFT layer may include an array of sensor pixel elements config- ured to amplify or buffer the electrical output signals gen- erated by the piezoelectric layer of the ultrasonic receiver 310. The electrical output signals provided by the array of sensor pixel elements may then be provided as raw mea- sured image data to the processing unit for use in processing the image data, identifying a fingerprint associated with the image data, and in some applications, authenticating a user associated with the fingerprint. In some aspects, a single piezoelectric layer may serve as the ultrasonic transmitter 308 and the ultrasonic receiver 310. In some aspects, the substrate 304 may be a glass, plastic or silicon substrate upon which electronic circuitry may be fabricated (e.g., a printed circuit board (PCB) of a user device and/or a flexible display). In some aspects, an array of sensor pixel elements and associated interface circuitry of the ultrasonic receiver 310 may be configured from complementary metal-oxide- semiconductor (CMOS) circuitry formed in or on the sub- strate 304. In some aspects, the substrate 304 may be positioned between the platen 306 and the ultrasonic trans- mitter 308 and/or between the platen 306 and the ultrasonic receiver 310. One or more protective layers, acoustic control layers, anti-smudge layers, adhesive layers, decorative lay- ers, conductive layers or other coating layers (not shown) of the ultrasonic fingerprint sensor system 300 may be included on one or more sides of the substrate 304 and the platen 306.

The platen 306 may be formed of one or more layers that may be acoustically coupled to the ultrasonic transmitter 308. For example, the platen 306 may be formed of one or more of glass, plastic, ceramic, sapphire, metal or metal alloy. In some aspects, the platen 306 may be a cover plate such as, for example, a cover glass or a lens glass of an underlying display. In some aspects, as described herein, the platen 306 may include an acoustics configuration layer that is configured to optimize an ultrasonic signal transmitted by the ultrasonic transmitter 308 and/or an ultrasonic signal received by the ultrasonic receiver 310. In some aspects, the platen 306 may include a recess (e.g., in a backing layer) that is configured to receive one or more components of the ultrasonic transducer 302 and/or the substrate 304. In some aspects, the platen 306 may include a non-resonating mate- rial (e.g., over a cover glass of the platen 306) that has a thickness that is based at least in part on a quarter-wave- length of an ultrasonic signal.

The number and arrangement of components shown in FIG. 3 are provided as an example. In practice, ultrasonic fingerprint sensor system 300 may include additional com- ponents, fewer components, different components, or differ- ently arranged components than those shown in FIG. 3. Additionally, or alternatively, a set of components (e.g., one or more components) of ultrasonic fingerprint sensor system 300 may perform one or more functions described as being performed by another set of components of ultrasonic fin- gerprint sensor system 300.

Figure 4:
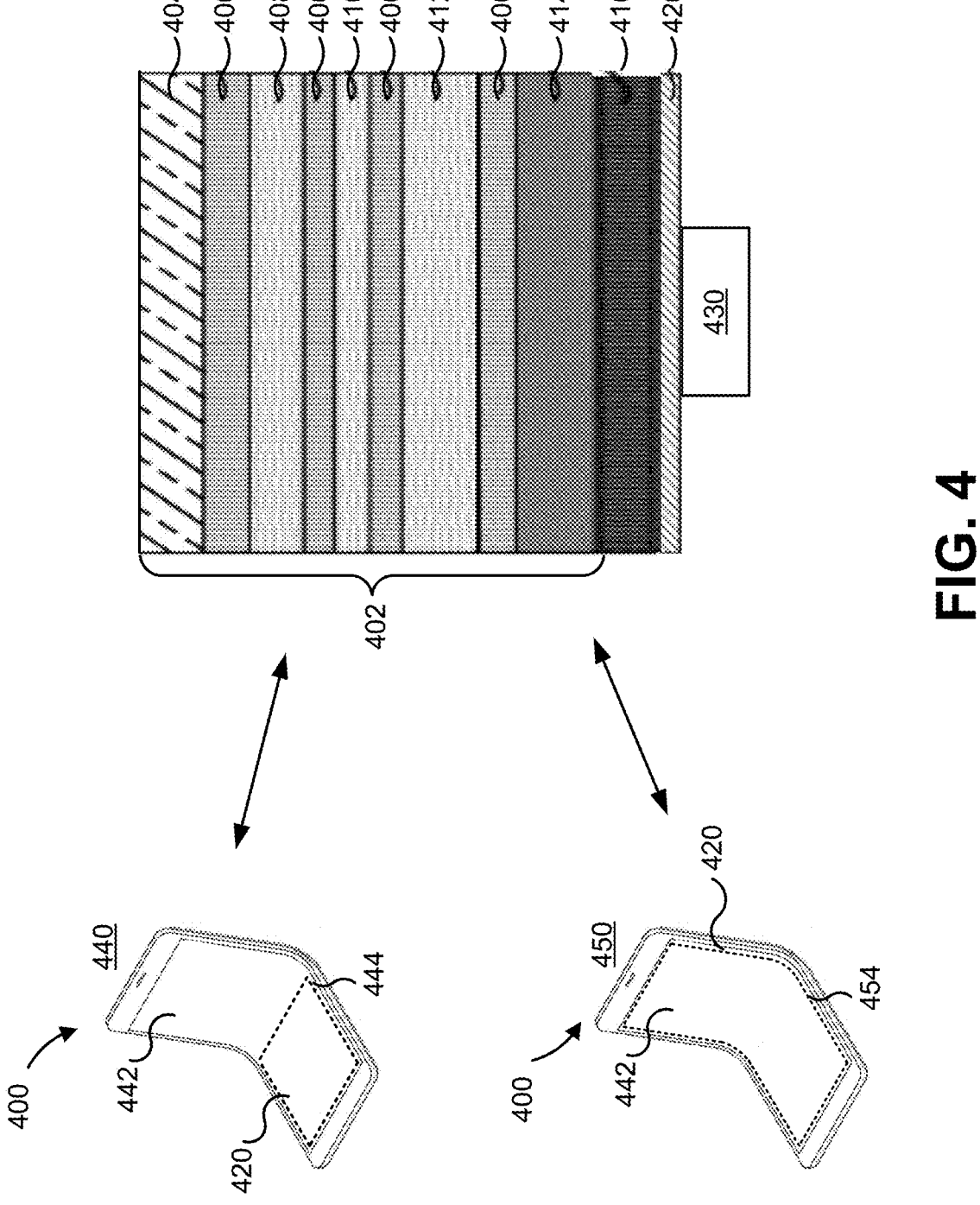
FIG. 4 is a diagram illustrating an example associated with an implementation of a configuration of a ultrasonic fingerprint sensor and a display, in accordance with various aspects of the present disclosure.

FIG. 4 is a diagram illustrating an example 400 associated with a configuration of an ultrasonic fingerprint sensor relative to a display of a device. FIG. 4 includes a cross- sectional plan view of a flexible display 402 that includes a plurality of layers. As shown, the flexible display 402 includes a cover layer 404, a plurality of adhesive film layers 406 (referred to herein individually as "adhesive film layer 404," and collectively as "adhesive film layers 404"), a glass layer 408, a polarizer layer 410, a panel layer 412, and a protection layer 414. The flexible display 402 may include one or more additional layers, such as a color filter, a polarizer, an anti-reflective film, an anti-shatter film, a barrier layer, an optical layer, a coating layer, a light- blocking layer, and/or the like.

The cover layer 404 may include a hard coating, such as a colorless polyimide (CPI), or the like and may have a thickness between 30 micrometers (μm or "microns") and 50 microns. The glass layer 408 may be formed of an ultra-thin glass (UTG) and may have a thickness between 10 microns and 50 microns. The cover layer 404 and glass layer 408 (along with an adhesive film situated therebetween) may form a glass cover of the flexible display 402 and may have an overall thickness between 60 microns and 100 microns. The polarizer 410 may include any suitable polarizing material and may have a thickness between 50-80 microns. The panel layer 412 may include an OLED panel, an LED panel, or the like and may have a thickness between 30 microns and 50 microns. The protection layer may include any suitable material or film that is configured to maintain a barrier and/or protect the panel layer 412 from one or more other components of a device (e.g., user device 110) asso- ciated with the flexible display 402.

The example device 400, in FIG. 4, further includes an adhesive layer 416, an acoustics configuration layer 420, and an ultrasonic fingerprint sensor 430. The adhesive layer 416 may be any suitable material, such as a non-porous adhesive material, an optically clear adhesive (OCA) material, or the like that is laminated to a layer of the flexible display 402. In some aspects, the flexible display 402 may not include a porous foam layer (e.g., as part of a backing layer of the flexible display 402). Additionally, or alternatively, the ultra- sonic fingerprint sensor 430 may be positioned within a recess of a backing layer of the flexible display that includes a base layer (e.g., a stainless steel layer, a glass layer, or the like) and/or a porous foam layer.

As described herein, the acoustics configuration layer 420 is configured to optimize an ultrasonic signal associated with the ultrasonic fingerprint sensor 430 and/or maintain a structural integrity of the flexible display 402 (e.g., to prevent the flexible display from being pressed into the ultrasonic fingerprint sensor 430). The ultrasonic fingerprint sensor 430 is configured to transmit and/or receive an ultrasonic signal in an acoustic path through the flexible display 402. The ultrasonic fingerprint sensor 430 may be configured in a receiver-up configuration or a receiver-down configuration. As shown in FIG. 4, the acoustics configura- tion layer 420 is situated between the flexible display 402 and the ultrasonic fingerprint sensor 430.

The acoustics configuration layer 420 may be configured to optimize a signal strength of an ultrasonic signal that is associated with (e.g., transmitted from and/or received by) the ultrasonic fingerprint sensor 430. For example, a thick- ness of the acoustics configuration layer 420 may be based at least in part on a half-wavelength of an ultrasonic signal associated with the ultrasonic fingerprint sensor 430 and a material of the acoustics configuration layer 420. In such an example, the acoustics configuration layer 420 may have a relatively thicker thickness (e.g., greater than or equal to 200 microns), depending on the type of material used to form the acoustics configuration layer. Further, in such a case, the acoustics configuration layer 420 may be formed of a non-resonating material, such as an aluminum material (e.g., 100% aluminum or an aluminum alloy), a plastic material (e.g., polyethylene terephthalate (PET), or the like), a glass material, or the like. As described herein, the flexible display 402 may be a bendable display and/or a foldable display.

Correspondingly, to facilitate such flexibility, a maximum thickness of the flexible display may be less than approximately 500 microns. According to some aspects, a maximum thickness of the flexible display 402 may be substantially the same as or less than a maximum thickness of the acoustics configuration layer 420 (though not shown to scale in FIG. 4). In such a case, the acoustics configuration layer 420 may permit the ultrasonic fingerprint sensor 430 to operate at a relatively higher operational frequency range (e.g., an operational frequency range that involves transmitting or receiving ultrasonic signals at frequencies between 10 megahertz (MHz) and 20 MHz).

Additionally, or alternatively, the acoustics configuration layer 420 may alter a frequency of an ultrasonic signal associated with the ultrasonic fingerprint sensor 430. For example, the acoustics configuration layer 420 may be formed from a resonating material (e.g., tin, lead, titanium, stainless steel, copper, tungsten, or the like) that is configured to alter the frequency of an ultrasonic signal. More specifically, the acoustics configuration layer 420 may be configured to increase an ultrasonic signal that is being transmitted and/or decrease an ultrasonic signal that is being received. In such a case, the acoustics configuration layer 420 may permit the ultrasonic fingerprint sensor 430 to operate at a relatively lower operational frequency range (e.g., an operational frequency range that involves transmitting or receiving ultrasonic signals at frequencies between 1 MHz and 15 MHz).

The acoustics configuration layer 420, when formed from a resonating material, may provide a fingerprint sensing area that is greater than an area or dimension of the ultrasonic fingerprint sensor 430 (e.g., a physical area of an array of sensing elements of the ultrasonic fingerprint sensor 430). In some aspects, dimensions (and/or a size and/or shape) of the fingerprint sensing area may correspond to dimensions of the acoustics configuration layer 420. In some aspects, the acoustics configuration layer 420, when formed of a resonating material, may have a thinner thickness (e.g., less than 50 microns).

As shown in FIG. 4, and by reference number 440, an area of the acoustics configuration layer 420 may correspond to a portion of the active area 442 of the flexible display 402 (e.g., an area that is capable of presenting an image via the flexible display 402). For example, a maximum area of the resonating material that forms the acoustics configuration layer 420, may be at least 25% of an active area of the flexible display 402. Correspondingly, in such an example, the acoustics configuration layer 420 provides a fingerprint sensing area 444 that covers a relatively large portion (e.g., 25% or more, 50% or more, or the like) of an active area 442 of the flexible display 402. As another example, shown by reference number 450, an area of the acoustics configuration layer 420 may correspond to the active area 442 of the flexible display 402. In such a case, the acoustics configuration layer 420 provides a fingerprint sensing area that may cover the active area 442 (or at least a majority of the active area 442). In this way, the acoustics configuration layer 420, when formed of a resonating material, can expand (relative to previous techniques) a fingerprint sensing area of the ultrasonic fingerprint sensor 430.

Accordingly, as described herein, a device may include a flexible display with an ultrasonic fingerprint sensor that uses an acoustics configuration layer 420 to optimize an ultrasonic signal associated with the ultrasonic fingerprint sensor. In this way, accuracy associated with measuring a fingerprint of the user and/or a fingerprint sensing area of the ultrasonic fingerprint sensor can be optimized for use in authenticating a user based at least in part on the user's fingerprint.

As indicated above, FIG. 4 is provided as an example. Other examples may differ from what is described with regard to FIG. 4.

Figure 5:
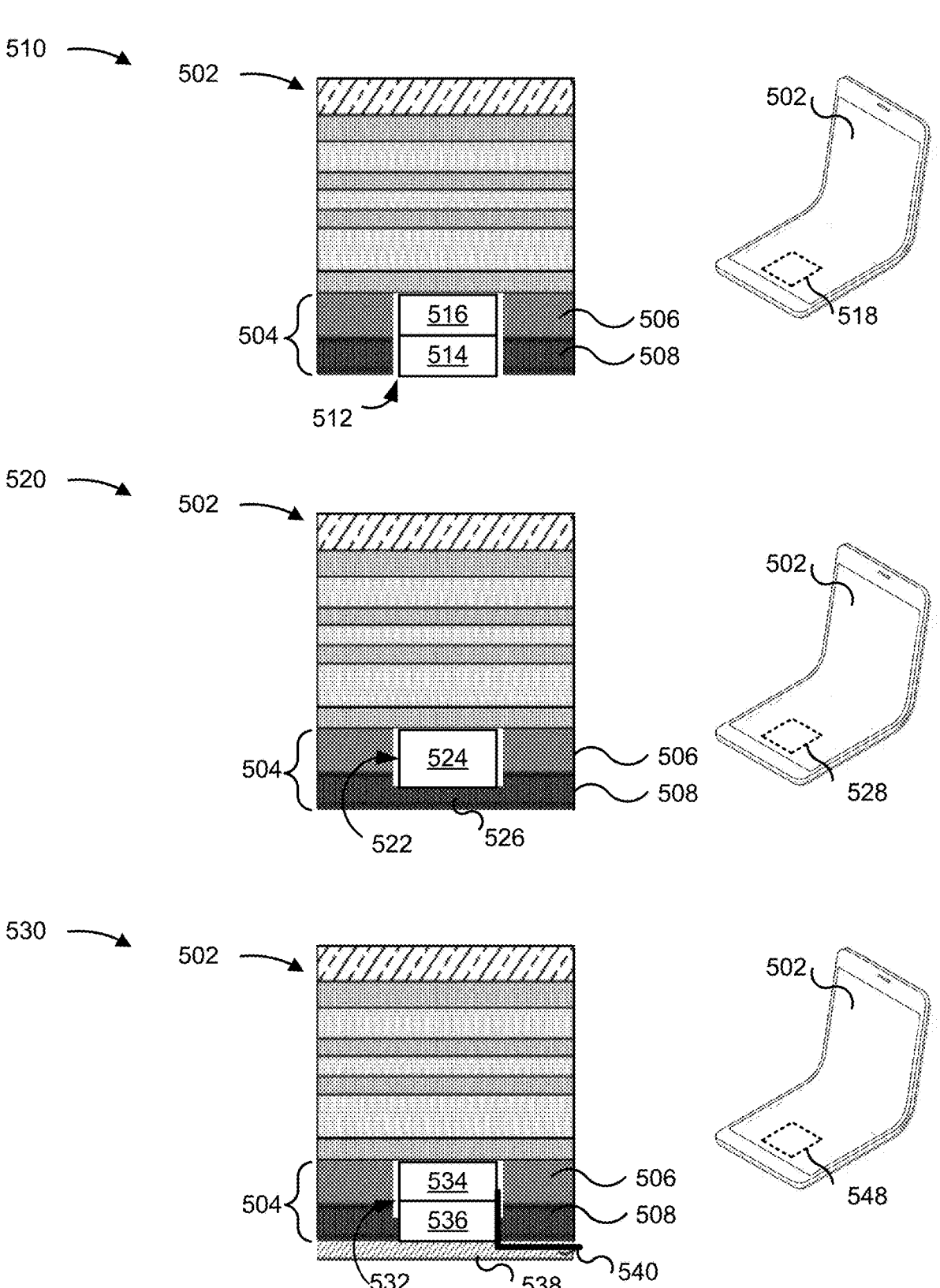
FIG. 5 is a diagram illustrating an example associated with another implementation of a configuration of an ultrasonic fingerprint sensor and a display, in accordance with various aspects of the present disclosure.

FIG. 5 is a diagram illustrating an example associated with a configuration of an ultrasonic fingerprint sensor relative to a display of a device. FIG. 5 includes cross-sectional plan views of a flexible display 502 that includes a backing layer 504. The backing layer 504 includes a porous foam layer 506 and a base layer 508. The backing layer 504 may be positioned between a panel layer of the flexible display 502 and a substrate of a device (e.g., the user device 110) associated with the flexible display 502.

As described herein, in the examples of FIG. 5, the backing layer 504 may include a recess that is configured to receive an ultrasonic fingerprint sensor (e.g., the ultrasonic fingerprint sensor 245 of FIG. 2). Accordingly, the ultrasonic fingerprint sensor 245 may be positioned within the recess to permit the backing layer 504 to maintain the structural integrity of the flexible display 502 and/or prevent the flexible display 502 from being compressed into the ultrasonic fingerprint sensor 245.

As shown in FIG. 5, and by reference number 510, the backing layer 504 includes a recess 512. The recess 512 includes an opening that extends through the porous foam layer 506 and the base layer 508 (e.g., or through a base of the base layer 508). An ultrasonic fingerprint sensor 514 is positioned within the recess 512. As further shown, a stiffener 516 is positioned within the recess 512. The stiffener 516 may be positioned between the ultrasonic fingerprint sensor 514 and the flexible display 502 (e.g., between the ultrasonic fingerprint sensor 514 and a panel layer of the flexible display 502), as shown. In some aspects, the ultrasonic fingerprint sensor 514 may be positioned between the stiffener 516 and the flexible display 502 (e.g., between the stiffener 516 and a panel layer of the flexible display). The stiffener 516 may be formed of a plastic material, a glass material, a steel material, an aluminum material, a compressed foam material, or the like. In some respects, the stiffener, such as (e.g., a stiffener formed from a resonating material, such as copper or stainless steel), can be an acoustic configuration layer (e.g., similar to the acoustics configuration layer 420 of example 400) to alter the frequency and/or magnitude of an ultrasonic signal associated with ultrasonic fingerprint sensor 514. One or more adhesive layers may be included between the flexible display 502, the ultrasonic fingerprint sensor 514, and/or the stiffener 516 to secure the ultrasonic fingerprint sensor 514 and/or the stiffener 516 within the recess. As shown, a cross-sectional area 518 of the recess 512 (e.g., a cross-sectional area that is parallel to an active area of the flexible display 502) may be relatively small (e.g., 20% or less of an active area of the flexible display 502).

As shown in FIG. 5, and by reference number 520, the backing layer 504 includes a recess 522. An ultrasonic fingerprint sensor 524 is positioned within the recess 522. The recess 522 includes an opening that extends through the porous foam layer 506 and has a base 526 in the base layer 508. In some aspects, the base 526 supports the ultrasonic fingerprint sensor 524 via a porous foam layer to maintain the structural integrity of the flexible display 502 (e.g., similar to a stiffener 516 positioned beneath the ultrasonic fingerprint sensor 524). An ultrasonic fingerprint sensor 514 is positioned within the recess 512. As further shown, a stiffener 516 is positioned within the recess 512. The base 526 (and/or base layer 508) may be formed of a plastic material, a glass material, a steel material, or the like. As shown, a cross-sectional area 528 of the recess 522 may be relatively small (e.g., 20% or less of an active area of the flexible display 502).

As shown in FIG. 5, and by reference number 530, the backing layer 504 includes a recess 532. An ultrasonic fingerprint sensor 534 is positioned within the recess 532 on a stiffener 536. The recess 532 includes an opening that extends through the porous foam layer 506, through the base layer 508, and to (or through) a PCB 538. The ultrasonic fingerprint sensor 534 and/or the stiffener 536 may be mounted to the PCB 538 (e.g., via one or more fasteners or adhesives) and/or communicatively coupled to the PCB 536 via a trace 540. As shown, a cross-sectional area 548 of the recess 532 may be relatively small (e.g., 20% or less of an active area of the flexible display 502).

As indicated above, FIG. 5 is provided as an example. Other examples may differ from what is described with regard to FIG. 5.

Figure 6:
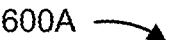
FIG. 6 is a diagram illustrating an example associated with an ultrasonic fingerprint sensor that includes an acoustics configuration layer configured in accordance with various aspects of the present disclosure.
Figure 6:
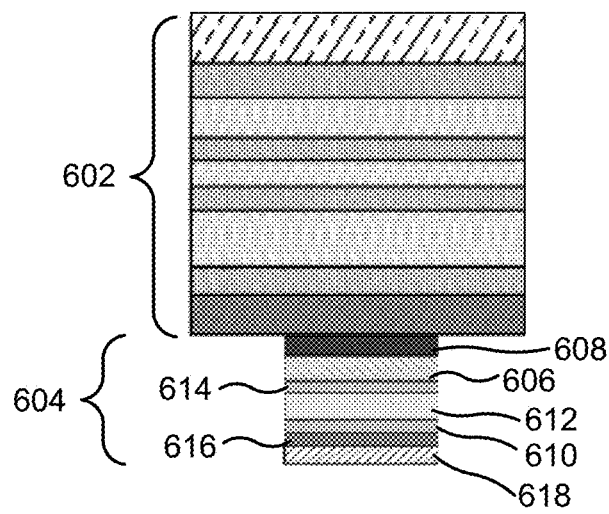
Figure 6:
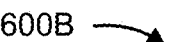
Figure 6:
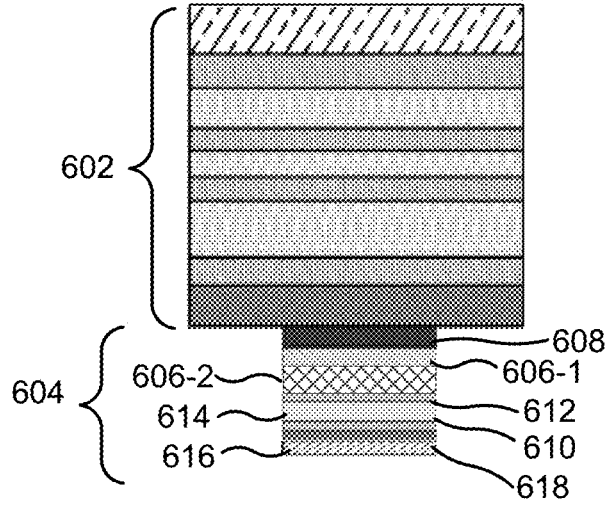

FIG. 6 is a diagram illustrating example 600A and 600B associated with configurations of an ultrasonic fingerprint sensor relative to a display of a device. FIG. 6 includes cross-sectional plan views of a display 602 with a ultrasonic fingerprint sensor 604 that includes an acoustics configuration layer 606. The display 602 may correspond to one or more of the flexible displays described elsewhere herein or any other suitable non-flexible display. Accordingly, the display 602 may or may not include a separate acoustics configuration layer from the acoustics configuration layer 606 of the ultrasonic fingerprint sensor 604. As shown in examples 600A and 600B of FIG. 6, the acoustics configuration layer 606 may be situated between the display layer and a sensing pixel layer 610 of the ultrasonic fingerprint sensor.

As shown in example 600A of FIG. 6, an adhesive layer 608 of the ultrasonic fingerprint sensor 604 may be between the display 602 and the acoustics configuration layer 606 (e.g., to adhere the ultrasonic fingerprint sensor 604 to the display 602, or vice versa). The ultrasonic fingerprint sensor 604 includes a transmitter layer 610 (e.g., a piezoelectric layer) and a sensing pixel layer 612 (e.g., a TFT layer). A thin adhesive layer 614 (e.g., an adhesive layer that is less than 20 microns thick) may be situated between the acoustics configuration layer 606 and the sensing pixel layer 612. In the examples 600A and 600B, the ultrasonic fingerprint sensor 606 includes an electrode layer 616 (e.g., a silver ink layer) and/or a base layer 618 (e.g., an epoxy film layer).

As described herein, the acoustics configuration layer 606 is configured to optimize an operational frequency of the ultrasonic fingerprint sensor 604. For example, a thickness of the acoustics configuration layer 606 may be based on a wavelength, a half wavelength, and/or a quarter wavelength of a ultrasonic signal emitted by the transmitter layer 610 and/or an ultrasonic signal that is to be received by the sensing pixel layer 612. For example, a relatively thinner acoustics configuration layer 606 (e.g., less than 100 microns) may cause the ultrasonic fingerprint sensor 604 to have a relatively lower operational frequency (e.g., less than 10 MHz) and a relatively thicker acoustics configuration layer 606 may cause the ultrasonic fingerprint sensor to have a relatively higher operational frequency (e.g., greater than 10 MHz).

Additionally, or alternatively, a thickness of the sensing pixel layer 612, a thickness of the transmitter layer 610, and/or a thickness of the electrode layer 616 are correspondingly configured or set based on the thickness of the acoustics configuration layer 606 (or vice versa). For example, when the ultrasonic fingerprint sensor 604 is configured to have a relatively lower operational frequency range, the acoustics configuration layer 606 may be relatively thinner and the electrode layer 616 is to be relatively thicker (e.g., greater than 10 microns). On the other hand, when the ultrasonic fingerprint sensor 604 is configured to have a relatively higher operational frequency, the electrode layer 616 is to be relatively thinner (e.g., less than 10 microns). Accordingly, a ratio between the acoustics configuration layer and one or more other layers may be configured to optimize the operational frequency of the ultrasonic fingerprint sensor 604. Further, a same form factor associated with the display 602 may be used to permit different configurations of the ultrasonic fingerprint sensor 604 to work with different operational frequency ranges.

As shown in example 600B of FIG. 6, the ultrasonic fingerprint sensor 604 may include a spacer 620 between the acoustics configuration layer and the thin adhesive layer 612. The spacer 620 may be formed of a non-resonating material and be configured to optimize the ultrasonic fingerprint sensor 604 to have a relatively higher operational frequency. Correspondingly, relative to the ultrasonic fingerprint sensor 604 being optimized to have a relatively lower operational frequency in example 600A, thicknesses of one or more other layers of the ultrasonic fingerprint sensor 604 in example 600B may be reduced. For example, the sensing pixel layer 612 may have thickness that is less than 100 microns and/or the electrode layer 616 may have a thickness that is less than 10 microns.

As indicated above, FIG. 6 is provided as an example. Other examples may differ from what is described with regard to FIG. 6.

The following provides an overview of aspects of the present disclosure:

Aspect 1: A device comprising: a flexible display; an ultrasonic fingerprint sensor that is configured to transmit and receive an ultrasonic signal in an acoustic path through the flexible display; and an acoustics configuration layer that is situated between the flexible display and the ultrasonic fingerprint sensor, wherein the acoustics configuration layer is configured to optimize a signal strength of the ultrasonic signal based at least in part on a configuration of one or more layers of the flexible display.

Aspect 2: The device of aspect 1, wherein the acoustics configuration layer is formed from a resonating material that is configured to alter a frequency of the ultrasonic signal.

Aspect 3: The device of aspect 1 or 2, wherein a thickness of the resonating material is approximately 10% of a thickness of the flexible display.

Aspect 4: The device of any of aspects 1-3, wherein an operational frequency range of the ultrasonic signal is between 1 megahertz and 15 megahertz.

Aspect 5: The device of any of aspects 1-4, wherein a maximum area of the resonating material is at least 25% of a maximum active area of the flexible display.

Aspect 6: The device of any of aspects 1-5, wherein a thickness of a non-resonating material of the acoustics configuration layer is based at least in part on a half-wavelength of the ultrasonic signal.

Aspect 7: The device of aspect 6, wherein a thickness of the non-resonating material is substantially the same as a thickness of the flexible display.

Aspect 8: The device of any of aspects 1-7, wherein an operational frequency range of the ultrasonic signal is between 10 megahertz and 20 megahertz.

Aspect 9: The device of any of aspects 1-8, wherein a non-porous adhesive layer is positioned between the flexible display and the acoustics configuration layer.

Aspect 10: The device of aspect 9, wherein the non-porous adhesive layer is laminated to a layer of the flexible display.

Aspect 11: The device of any of aspects 1-10, wherein the ultrasonic fingerprint sensor is positioned within a recess of a backing layer of the flexible display.

Aspect 12: The device of aspect 11, wherein the backing layer comprises at least one of a porous foam layer or a base layer.

Aspect 13: The device any of aspects 1-12, wherein the flexible display comprises a cover glass that has a maximum thickness that is less than 200 microns.

Aspect 14: The device of aspect 13, wherein a thickness of a non-resonating material over the cover glass is based at least in part on a quarter-wavelength of the ultrasonic signal.

Aspect 15: A device comprising: a flexible display that includes a backing layer, wherein the backing layer includes a porous foam layer, a base layer, and a recess; and an ultrasonic fingerprint sensor that is configured to transmit and receive an ultrasonic signal in an acoustic path through the flexible display, wherein the ultrasonic fingerprint sensor is positioned within the recess and coplanar to at least one of the porous foam layer or the base layer.

Aspect 16: The device of aspect 15, further comprising a stiffener that is positioned within the recess.

Aspect 17: The device of aspect 16, wherein the stiffener is positioned between the ultrasonic fingerprint sensor and a panel layer of the flexible display.

Aspect 18: The device of aspect 16 or 17, wherein the ultrasonic fingerprint sensor is positioned between the stiffener and a panel layer of the flexible display.

Aspect 19: The device of any of aspects 16-18, wherein the stiffener is positioned between the ultrasonic fingerprint sensor and a base of the recess that is in the base layer.

Aspect 20: The device of any of aspects 16-19, wherein the stiffener is formed from a resonating material that is configured to alter a frequency of the ultrasonic signal.

Aspect 21: The device of any of aspects 16-20, wherein the recess comprises an opening that extends through the porous foam layer and through the base layer.

Aspect 22: The device of any of aspects 15-21, wherein the recess comprises an opening through the porous foam layer and a base that is within the base layer.

Aspect 23: The device of any of aspects 15-22, wherein the base layer is between the porous foam layer and a printed circuit board, wherein the ultrasonic fingerprint sensor is mounted to the printed circuit board.

Aspect 24: The device of any of aspects 15-23, wherein a cross-sectional area of the recess is less than 20% of an area of an active display of the flexible display, wherein the cross-sectional area is parallel to a portion of the active display.

Aspect 25: The device of any of aspects 15-24, wherein the flexible display comprises a cover glass that has a thickness that is less than 200 microns.

Aspect 26: An ultrasonic fingerprint sensor comprising: a transmitter layer; an acoustics configuration layer; and a sensing pixel layer that is situated between the transmitter layer and the acoustics configuration layer, wherein the acoustics configuration layer is configured to optimize an operational frequency of an ultrasonic signal emitted by the transmitter layer or received by the sensing pixel layer.

Aspect 27: The ultrasonic fingerprint sensor of aspect 26, wherein an area of the piezoelectric area, an area of the acoustics configuration layer, an area of the sensor pixel layer are coplanar are same size, and are a same shape.

Aspect 28: The ultrasonic fingerprint sensor of aspect 26 or 27, wherein the acoustics configuration layer is formed of a resonating material and has a thickness that is proportional to a half wavelength of the ultrasonic signal.

Aspect 29: The ultrasonic fingerprint sensor of any of aspects 26-28, wherein the acoustics configuration layer is configured to optimize the operational frequency based at least in part on one or more of: a ratio associated with a thickness of the acoustics configuration layer and a thickness of the sensing pixel layer, a type of one or more materials of the acoustics configuration layer, or a thickness of the acoustics configuration layer and a thickness of a spacer between the acoustics configuration layer and the sensing pixel layer.

Aspect 30: A device comprising: a display; an ultrasonic fingerprint sensor; and an acoustics configuration layer formed of a resonating material, wherein the acoustics configuration layer is at least one of: a layer of the display that is configured to be nearest the ultrasonic fingerprint sensor, or a layer of the ultrasonic fingerprint sensor that is configured to be nearest the display.

Aspect 31: A method performed by one or more of the devices of any of aspects 1-25 or 30.

Aspect 32: An apparatus comprising at least one means for performing a method performed by one or more of the devices of any of aspects 1-25 or 30.

Aspect 33: A non-transitory computer-readable medium storing instructions, wherein the instructions, when executed, are to cause a processor to perform a method that is performed by one or more of the devices of any of aspects 1-25 or 30.

Aspect 34: A method performed by the ultrasonic fingerprint sensor of any of aspects 26-29.

Aspect 35: An apparatus comprising at least one means for performing a method performed by the ultrasonic fingerprint sensor of any of aspects 26-29.

Aspect 36: A non-transitory computer-readable medium storing instructions, wherein the instructions, when executed, are to cause a processor to perform a method that is performed by the ultrasonic fingerprint sensor of any of aspects 26-29.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based at least in part on" is intended to mean "based, at least, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device comprising:
a flexible display;
an ultrasonic fingerprint sensor that is configured to transmit and receive an ultrasonic signal in an acoustic path through the flexible display; and
an acoustics configuration layer that is situated between the flexible display and the ultrasonic fingerprint sensor,
wherein:
the acoustics configuration layer is configured to optimize a signal strength of the ultrasonic signal based at least in part on a configuration of one or more layers of the flexible display,
the acoustics configuration layer is formed from a resonating material that is configured to cause a first alteration of a transmission of the ultrasonic signal and cause a second alteration of a reception of the ultrasonic signal, the second alteration being different from the first alteration, and
a thickness of the resonating material is approximately 10% of the thickness of all layers of the flexible display.

2. The device of claim 1, wherein the resonating material includes tin, lead, titanium, stainless steel, copper, or tungsten.

3. The device of claim 1, wherein the thickness of the resonating material is less than 50 microns.

4. The device of claim 1, wherein an operational frequency range of the ultrasonic signal is between 1 megahertz and 15 megahertz.

5. The device of claim 1, wherein a maximum area of the resonating material is at least 25% of a maximum active area of the flexible display.

6. The device of claim 1, wherein a thickness of a non-resonating material of the acoustics configuration layer is based at least in part on a half-wavelength of the ultrasonic signal.

7. The device of claim 6, wherein the thickness of the non-resonating material is substantially the same as the thickness of all layers of the flexible display.

8. The device of claim 1, wherein an operational frequency range of the ultrasonic signal is between 10 megahertz and 20 megahertz.

9. The device of claim 1, wherein a non-porous adhesive layer is positioned between the flexible display and the acoustics configuration layer.

10. The device of claim 9, wherein the non-porous adhesive layer is laminated to a layer of the flexible display.

11. The device of claim 1, wherein the ultrasonic fingerprint sensor is positioned within a recess of a backing layer of the flexible display.

12. The device of claim 11, wherein the backing layer comprises at least one of a porous foam layer or a base layer.

13. The device of claim 1, wherein the flexible display comprises a cover glass that has a maximum thickness that is less than 200 microns, wherein a thickness of a non-resonating material over the cover glass is based at least in part on a quarter-wavelength of the ultrasonic signal.

14. The device of claim 1, wherein a thickness of the acoustics configuration layer is less than 50 microns.

15. A device comprising:
a flexible display;
an ultrasonic fingerprint sensor that is configured to transmit and receive an ultrasonic signal in an acoustic path through the flexible display; and
an acoustics configuration layer,
wherein:
the acoustics configuration layer is configured to optimize a signal strength of the ultrasonic signal based at least in part on a configuration of one or more layers of the flexible display,
the acoustics configuration layer is formed from a resonating material that is configured to cause a first alteration of a transmission of the ultrasonic signal and cause a second alteration of a reception of the ultrasonic signal, the second alteration being different from the first alteration, and
a thickness of the resonating material is approximately 10% of the thickness of all layers of the flexible display.

16. The device of claim 15, wherein the flexible display includes a backing layer,
wherein the backing layer includes a recess, wherein the device further comprises a stiffener that is positioned within the recess, and wherein the stiffener is the acoustic configuration layer.

17. The device of claim 16, wherein the stiffener is positioned between the ultrasonic fingerprint sensor and a panel layer of the flexible display.

18. The device of claim 16, wherein the ultrasonic fingerprint sensor is positioned between the stiffener and a panel layer of the flexible display.

19. The device of claim 16, wherein the backing layer further includes a base layer, and wherein the stiffener is positioned between the ultrasonic fingerprint sensor and a base of the recess that is in the base layer.

20. A device comprising:

a display;

an ultrasonic fingerprint sensor; and an acoustics configuration layer formed of a resonating material, wherein:

the acoustics configuration layer is configured to optimize a signal strength of an ultrasonic signal based at least in part on a configuration of one or more layers of the display, the resonating material is configured to cause a first alteration of a transmission of the ultrasonic signal and cause a second alteration of a reception of the ultrasonic signal, the second alteration being different from the first alteration, and a thickness of the resonating material is approximately 10% of the thickness of all layers of the display.

\* \* \* \* \*